United States Patent
Sakurai

(10) Patent No.: US 8,928,721 B2
(45) Date of Patent: Jan. 6, 2015

(54) LIGHT BEAM EMISSION APPARATUS AND IMAGE FORMING APPARATUS INCLUDING LIGHT BEAM EMISSION APPARATUS

(75) Inventor: Yuuta Sakurai, Toride (JP)

(73) Assignee: Canon Kabushiki Kaisha, Tokyo (JP)

(*) Notice: Subject to any disclaimer, the term of this patent is extended or adjusted under 35 U.S.C. 154(b) by 42 days.

(21) Appl. No.: 13/495,655

(22) Filed: Jun. 13, 2012

(65) Prior Publication Data

US 2012/0320140 A1 Dec. 20, 2012

(30) Foreign Application Priority Data

Jun. 17, 2011 (JP) .................. 2011-135102

(51) Int. Cl.
*B41J 2/385* (2006.01)
*B41J 2/47* (2006.01)
*B41J 27/00* (2006.01)
*G02B 26/12* (2006.01)

(52) U.S. Cl.
CPC ............. *B41J 2/471* (2013.01); *G02B 26/127* (2013.01); *G02B 26/123* (2013.01)
USPC .......... 347/259; 347/134; 347/137; 347/255; 347/258; 347/260; 347/261

(58) Field of Classification Search
USPC .......... 347/134, 137, 255, 258, 259, 260, 261
See application file for complete search history.

(56) References Cited

U.S. PATENT DOCUMENTS

| | | | |
|---|---|---|---|
| 2002/0012041 A1* | 1/2002 | Mogi et al. | 347/238 |
| 2006/0203079 A1* | 9/2006 | Sakai et al. | 347/243 |
| 2007/0002415 A1* | 1/2007 | Kato et al. | 359/196 |
| 2008/0212999 A1* | 9/2008 | Masuda et al. | 399/158 |
| 2009/0015896 A1* | 1/2009 | Masuda | 359/205 |

FOREIGN PATENT DOCUMENTS

| | | |
|---|---|---|
| JP | 2006-91157 A | 4/2006 |
| JP | 2006-259098 A | 9/2006 |

\* cited by examiner

*Primary Examiner* — Justin Seo
*Assistant Examiner* — Kendrick Liu
(74) *Attorney, Agent, or Firm* — Canon USA Inc IP Division

(57) ABSTRACT

A light beam emission apparatus separates, via a half mirror, apart of a laser beam emitted from a semiconductor laser towards a photosensitive member, guides the separated laser beam to an optical sensor to detect a light quantity, and controls the light quantity based on the detected result. The light beam emission apparatus includes a first light blocking member located between the semiconductor laser and the half mirror, and a second light blocking member located between the half mirror and the optical sensor.

6 Claims, 10 Drawing Sheets

LIGHT BEAM EMISSION APPARATUS AND IMAGE FORMING APPARATUS INCLUDING LIGHT BEAM EMISSION APPARATUS

BACKGROUND OF THE INVENTION

1. Field of the Invention

The present disclosure relates to a light beam emission apparatus configured to detect a light quantity of a light beam and to control the light quantity of the light beam based on the detected result, and an image forming apparatus including the light beam emission apparatus.

2. Description of the Related Art

An image forming apparatus, such as a copying machine and a printer, using an electrophotographic method forms an electrostatic latent image on a photosensitive member by scanning the photosensitive member with a light beam, such as a laser beam, and develops the latent image with tonner. As for an apparatus that emits a laser beam for exposing the photosensitive member, a light beam emission apparatus, such as an optical scanning apparatus, has been used.

The above optical scanning apparatus converts a light flux from a semiconductor laser (light source) into a substantially parallel light flux, and then deflects the light flux by a rotating polygonal mirror (hereinafter referred to as a polygon mirror). The laser beam deflected by the rotating polygon mirror substantially linearly scans the photosensitive member.

The optical scanning apparatus in recent years exposes a photosensitive member with a plurality of laser beams emitted from a plurality of light emitting points, to deal with a high image forming rate and high image resolution. Particularly, in a vertical cavity surface emitting laser (VCSEL), a plurality of light emitting points can be easily arrayed and thus, it has been proposed to use the VCSEL as a light source of the optical scanning apparatus.

The optical scanning apparatus detects a light quantity from a light source by an optical sensor and controls the quantity of a laser beam emitted from the light source based on the detected light quantity. The VCSEL is different from an edge-emitting semiconductor laser and does not have a back surface laser beam corresponding to a laser beam guided to a photosensitive member. Thus, to control the light quantity of a laser beam emitted from the VCSEL, Japanese Patent Application Laid-Open No. 2006-91157 and Japanese Patent Application Laid-Open No. 2006-259098 each discuss an optical scanning apparatus that separates a part of the laser beam emitted to the photosensitive member by a half mirror and detects the light quantity by guiding the separated laser beam to an optical sensor. A light quantity ratio between the light quantity of a laser beam passing through a half mirror and reaching a photosensitive member and the light quantity of a laser beam guided to an optical sensor is uniquely determined by the reflectance of the half-mirror. Therefore, by controlling the light quantity of the laser beam emitted from the VCSEL according to the received light quantity of the optical sensor, the optical scanning apparatus can control the light quantity of the laser beam reaching the photosensitive member to become a target light quantity.

However, the optical scanning apparatus discussed in Japanese Patent Application Laid-Open No. 2006-91157 has the following issue. As illustrated in FIG. 9, a far field pattern (FFP) depending on a spreading angle of a laser beam emitted from the VCSEL varies with a driving current and temperature rising of the VCSEL element itself. The driving current is controlled to control the light quantity of the laser beam to become a target light quantity during image forming. Further, when the VCSEL element emits a laser beam, the temperature of the VCSEL element rises. Thus, the FFP varies according to these factors.

An optical scanning apparatus discussed in Japanese Patent Application Laid-Open No. 2006-91157 includes a first aperture, restricting a pass of a laser beam before being incident on a half mirror, and a second aperture, restricting a pass of a laser beam after passing through the half mirror (refer to FIG. 1 in Japanese Patent Application Laid-Open No. 2006-91157). Further, another optical scanning apparatus discussed therein includes a first aperture, restricting a pass of a laser beam reflected by the half mirror, and a second aperture, restricting a pass of a laser beam after passing through the half mirror (refer to FIG. 3 in Japanese Patent Application Laid-Open No. 2006-91157). In these optical scanning apparatuses, sizes of openings of the first aperture and the second aperture are different, so that the light quantity ratio between the light quantity of a laser beam passing through the half mirror and reaching the photosensitive member and the light quantity of a laser beam guided to the optical sensor varies according to the variation of the FFP. Thus, even if the light quantity of the laser beam emitted from the VCSEL is controlled based on the result detected by the optical sensor, the light quantity of the laser beam reaching the photosensitive member cannot be controlled to become a target light quantity.

On the other hand, in an optical scanning apparatus discussed in Japanese Patent Application Laid-Open No. 2006-259098, the light quantity ratio can be kept constant by integrating the half mirror and the aperture, even when the FFP varies. However, in an optical scanning apparatus including a configuration illustrated in FIG. 10, in which a laser beam emitted from a semiconductor laser 1001 passes through a lens barrel portion 1003*a* (a lens tube) of a holding member 1003 holding a collimator lens 1002, a laser beam reflected on the inner surface of the lens barrel portion 1003*a* is reflected by the half mirror 1004 and is then incident on the optical sensor 1005. On the other hand, a laser beam reflected on the inner surface of the lens barrel portion 1003*a* and passing through the half mirror 1004 is not incident on a polygon mirror 1006, so that the laser beam does not reach the photosensitive member. Accordingly, the light quantity ratio varies according to the variation of the FFP of a laser beam.

SUMMARY OF THE INVENTION

According to an aspect disclosed herein, a light beam emission apparatus includes a light source, a collimator lens, a holding member, a first light blocking member, a separation unit, an optical unit, a light-receiving unit, a control unit, and a second light blocking member. The light source is configured to emit a light beam. The collimator lens is configured to convert the light beam emitted from the light source into parallel light. The holding member is configured to support the light source and the collimator lens and includes a lens barrel portion through which the light beam emitted from the light source toward the collimator lens passes. The first light blocking member is configured to block a portion of a light beam passing through the collimator lens. The separation unit is configured to separate the light beam passing through the first light blocking member into a transmitted light beam and a reflected light beam. The optical unit is configured to guide the transmitted light beam to an irradiated member. The light-receiving unit is configured to receive the reflected light beam. The control unit is configured to control a light quantity of a light beam emitted from the light source based on a light quantity of the reflected light beam received by the light-receiving unit. The second light blocking member is arranged between the separation unit and the light-receiving unit and is configured to block a portion of the reflected light beam.

Further features and aspects will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles disclosed herein.

DESCRIPTION OF THE EMBODIMENTS

Various exemplary embodiments, features, and aspects will be described in detail below with reference to the drawings.

Figure 1:
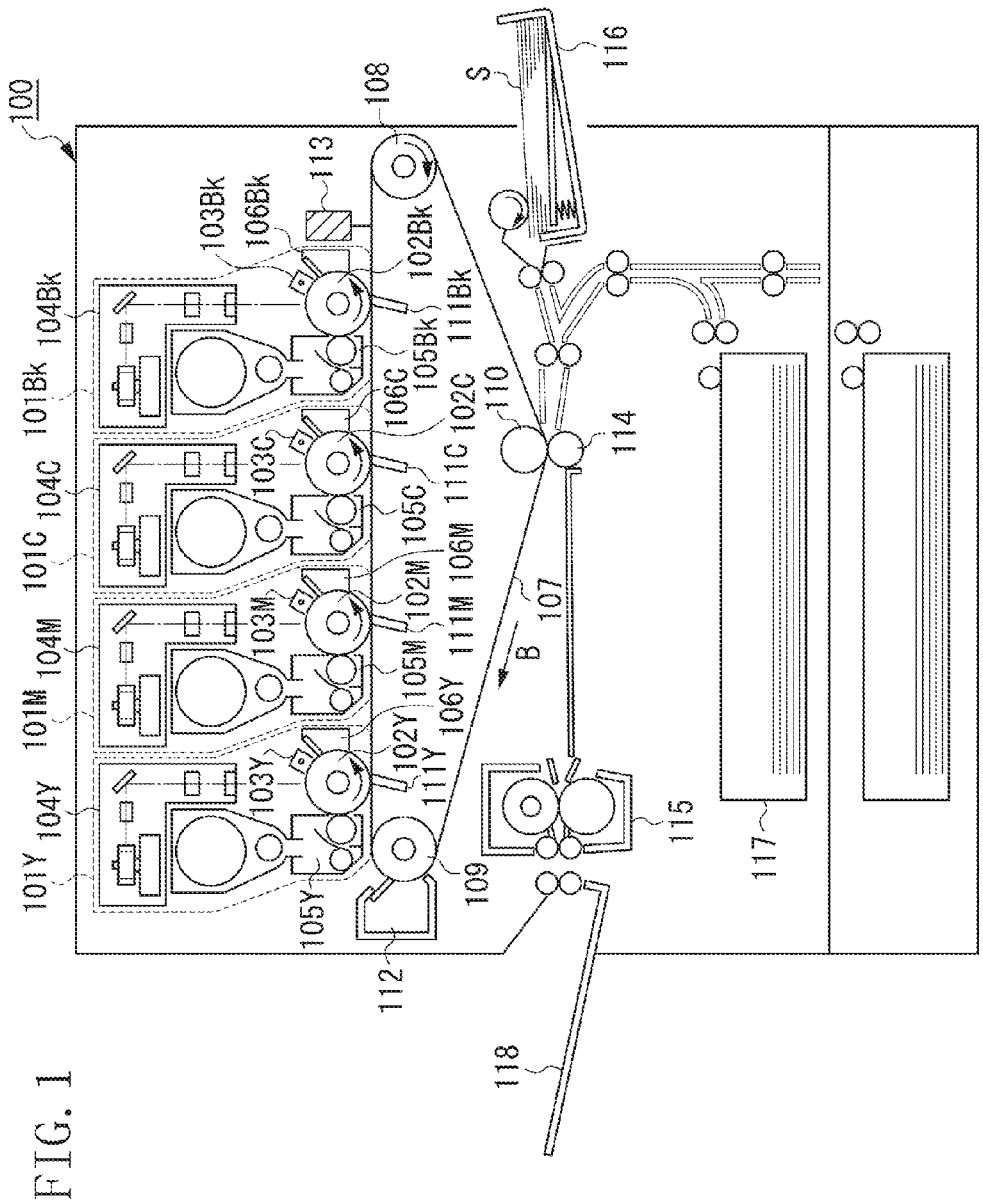
FIG. 1 is a schematic view of an image forming apparatus according to a first exemplary embodiment.
Figure 2:
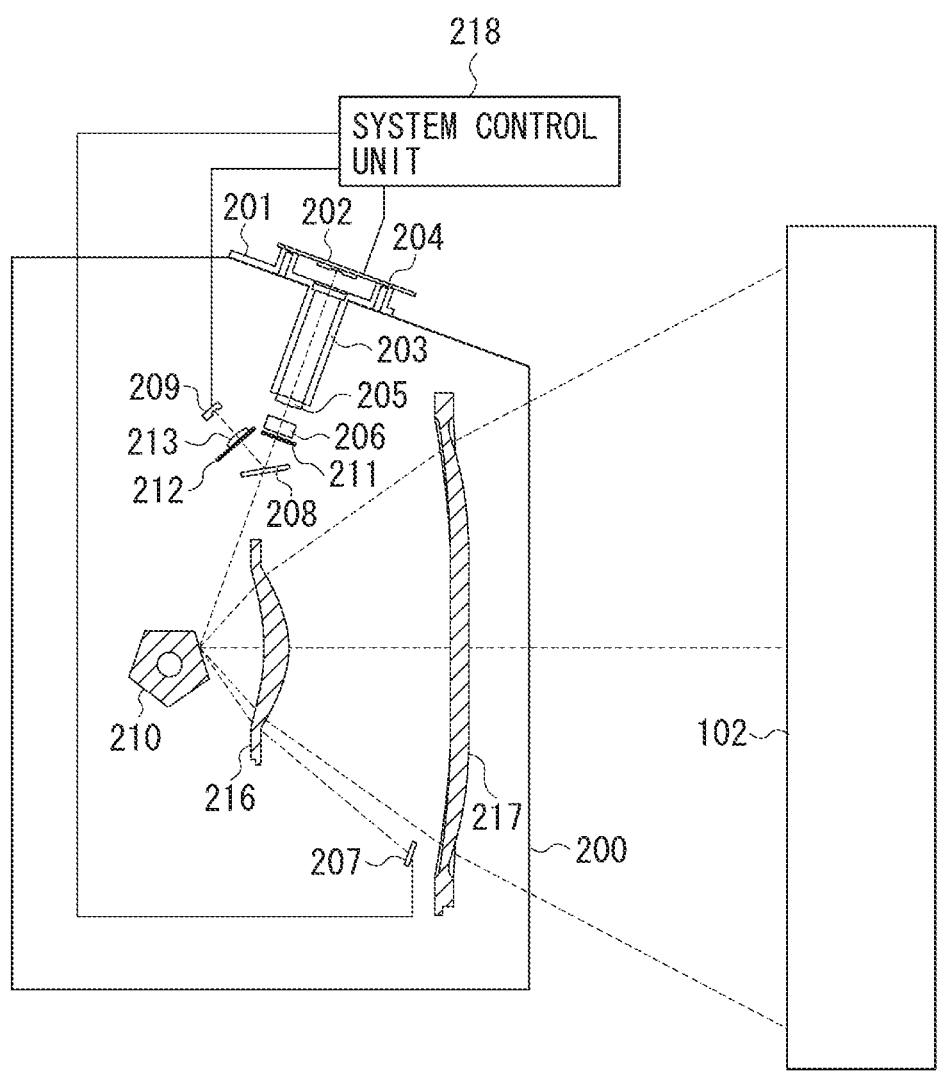
FIG. 2 is a schematic view of an optical scanning apparatus according to the first exemplary embodiment.

FIG. 1 is a schematic view of a digital full-color printer (a color image forming apparatus) configured to form an image using a plurality of color toners according to a first exemplary embodiment. FIG. 2 is a schematic developed view illustrating an optical scanning apparatus, which is a light beam emission apparatus, provided in the digital full-color printer illustrated in FIG. 1. In addition, in the present exemplary embodiment, the color image forming apparatus and the optical scanning apparatus provided in the color image forming apparatus are described as an example. However, the exemplary embodiment is not limited to the color image forming apparatus and the optical scanning apparatus provided in the color image forming apparatus, but can be an image forming apparatus configured to form an image using only a mono-color toner, for example, black, and an optical scanning apparatus provided in such an image forming apparatus.

An image forming apparatus 100 according to the first exemplary embodiment will be described with reference to FIG. 1. In the image forming apparatus 100, four image forming units 101Y, 101M, 101C, and 101Bk, which form an image by color, are located. Here, Y, M, C, and Bk indicate colors of yellow, magenta, cyan, and black, respectively. The image forming units 101Y, 101M, 101C, and 101Bk respectively form an image using toners of yellow, magenta, cyan, and black.

In the image forming units 101Y, 101M, 101C, and 101Bk, photosensitive drums 102Y, 102M, 102C, and 102Bk are provided as an image bearing member. Around the photosensitive drums 102Y, 102M, 102C, and 102 Bk, charging devices 103Y, 103M, 103C, and 103Bk, optical scanning apparatuses 104Y, 104M, 104C, and 104Bk, and development devices 105Y, 105M, 105C, and 105Bk are respectively provided. Further, around the photosensitive drums 102Y, 102M, 102C, and 102Bk, drum cleaning devices 106Y, 106M, 106C, and 106Bk are located.

Below the photosensitive drums 102Y, 102M, 102C, and 102Bk, an intermediate transfer belt 107, which is a endless belt, is located. The intermediate transfer belt 107 is stretched between a driving roller 108 and driven rollers 109 and 110, and rotates in the direction of arrow B during image forming. Further, at positions opposite the photosensitive drums 102Y, 102M, 102C, and 102Bk via the intermediate transfer belt 107 (an intermediate transfer member), primary transfer devices 111Y, 111M, 111C, and 111Bk are provided. Further, in the vicinity of the intermediate transfer belt 107, a cleaning device 112 for cleaning toners remained on the belt and a sensor 113 (a detection unit) for reading a predetermined image pattern to detect an amount of displacement of each toner image are provided.

Further, the image forming apparatus 100 according to the first exemplary embodiment includes a secondary transfer device 114 for transferring a toner image on the intermediate transfer belt 107 to a recoding medium S and a fixing device 115 for fixing the toner image onto the recoding medium S.

An image forming process of the image forming apparatus 100 with the above configuration will be described. Since the image forming process in each image forming unit is the same, the image forming process in the image forming unit will be described by using the image forming unit 101Y, and description of the image forming processes in the image forming units 101M, 101C, and 101Bk is omitted.

At first, the charging device 103Y in the image forming unit 101Y charges the photosensitive drum 102Y. A laser beam emitted from a light source such as a semiconductor laser based on image data is deflected by the rotating polygon mirror 210 and scans the charged photosensitive drum 102Y (an image bearing body). With this process, an electrostatic latent image is formed on the rotating photosensitive member 102Y. Then, the electrostatic latent image is developed by the development device 105Y as a toner image of yellow.

The toner images of yellow, magenta, cyan, and black formed on the photosensitive drums 102Y, 102M, 102C, and 102Bk in the respective image forming units are transferred to the intermediate transfer belt 107 by the primary transfer devices 111Y, 111M, 111C, and 111Bk. With this process, toner images of the respective colors are overlaid on the intermediate transfer belt 107.

After the toner images of four colors are transferred to the intermediate transfer belt 107, the four color toner images on the intermediate transfer belt 107 are further transferred (secondary transfer) by the secondary transfer device 114 to the recording medium S, which has been conveyed to a secondary transfer position from a manual feed cassette 116 or a feed cassette 117. The recording medium S is conveyed so as to fit the moving timing of the toner image on the intermediate transfer belt 107 by a feed roller and a conveying roller in the manual feed cassette (a multi-purpose tray) 117 and a registration roller. Then, the toner image on the recording medium S is heat-fixed by the fixing device 115 and is then discharged to a sheet discharge unit 118, so that a full color image is formed on the recording medium S.

In addition, in each of the photosensitive drums 102Y, 102M, 102C, and 102Bk, after the transfer is ended, remaining toners are removed by the drum cleaning devices 106Y, 106M, 106C, and 106Bk to make these drums ready for subsequent image forming.

Then, configurations of the optical scanning apparatuses 104Y, 104M, 104C, and 104Bk will be described with reference to FIG. 2. In addition, since the configuration of each optical scanning apparatus is the same, the suffixes of Y, M, C, and Bk, which indicate color, are omitted in the following description. The optical scanning apparatus 104 includes a housing 200 and, in the housing 200, elements described as follows are located.

In the optical scanning apparatus 104, a semiconductor laser 202, for example, a VCSEL, which is a light source emitting a laser beam (a light beam), is provided. The semiconductor laser 202 is attached to a laser holder 201 (a holding member) together with a collimator lens 205 described below. The laser holder 201 includes a lens barrel portion 203, and the collimator lens 205 is attached at a top end of the lens barrel portion 203. The collimator lens 205 converts a laser beam (divergent light) emitted from the semiconductor laser 202 into parallel light. The setting position of the collimator lens 205 is adjusted so as to cause a ray center of the laser beam from the semiconductor laser 202 to agree with an optical axis of the collimator lens 205, with an irradiation position and a focus of the laser beam emitted from the semiconductor laser 202 detected by a specific tool when the optical scanning apparatus 104 is assembled. After the setting position of the collimator lens 205 is determined, the collimator lens 202 is adhesively fixed to the laser holder 201 with an ultraviolet (UV) ray radiated on a UV-curable adhesive. The laser holder 201 includes the lens barrel portion 203 with a cylindrical shape. The lens barrel portion 203 is provided to cause a ray center of the laser beam from the semiconductor laser 202 to precisely agree with an optical axis of the collimator lens 205. Further, in a case where a semiconductor laser 202 that has a comparatively low light quantity and a narrow FFP is used, it is necessary to increase a light use efficiency of the semiconductor laser 202 by prolonging the lens barrel portion 203 of the laser holder 201.

The semiconductor laser 202 is electrically connected to an electric circuit board 204 and emits a laser beam by current supplied from the electric circuit board 204. At a side wall of the housing 200, a fitting hole portion for positioning the laser holder 201 is provided, and the laser holder 201 is positioned with respect to the housing 200 by fitting the lens barrel portion 203 of the laser holder 201 into the fitting hole portion. To adjust an image-forming interval (an interval in the sub-scanning direction) of a plurality of laser beams in the rotation direction of the photosensitive member on the photosensitive member, the laser holder 201 can be rotated finely.

The laser beam having passed through the collimator lens 205 passes through a cylindrical lens 206 and is then incident on a polygon mirror 210 (a rotating polygonal mirror). The polygon mirror 210 is an optical unit configured to guide a laser beam to a photosensitive member, which is an irradiated member. The polygon mirror 210 is rotating-driven at a constant speed by a motor not illustrated. The laser beam incident on the polygon mirror 210 is deflected by a reflection surface thereof and converted into scanning light moving in the predetermined direction on the photosensitive drum 102. The scanning light is converted into scanning light that scans the photosensitive drum 102 at a constant speed by a first image-forming lens 216 (a first fθ lens) and a second image-forming lens 217 (a second fθ lens), and is image-formed on the photosensitive drum 102 after passing through the second image-forming lens 217.

The optical scanning apparatus 104 includes a beam detection (BD) sensor 207, which is a synchronization detection unit. The BD sensor 207 is located on a moving path of scanning light by the polygon mirror 210. When a laser beam is incident on the BD sensor 207, the BD sensor 207 generates a synchronization signal. A system control unit 218 performs auto power control (APC) of the laser beam and emission control of the laser beam corresponding to image data based on the synchronization signal.

Figure 3:
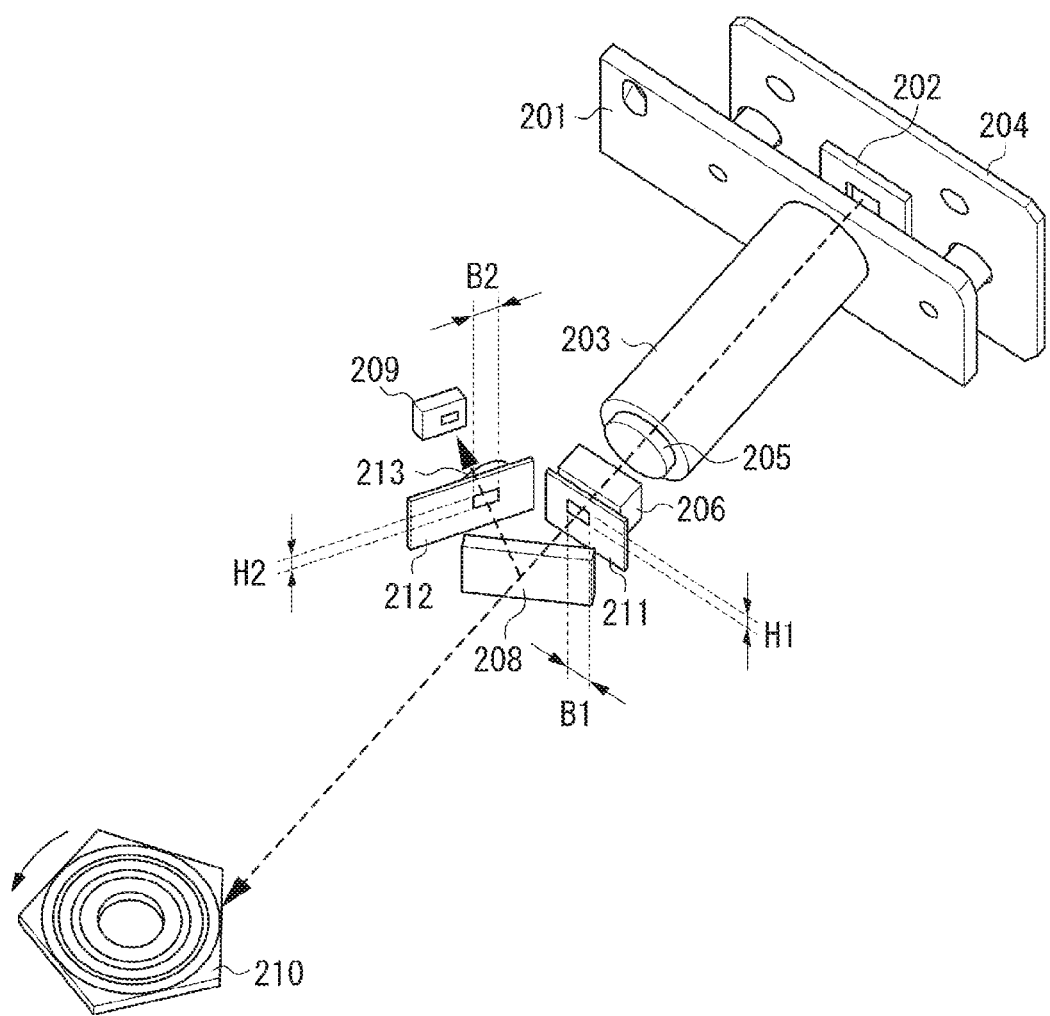
FIG. 3 is an enlarged perspective view illustrating the vicinity of a semiconductor laser provided in the optical scanning apparatus according to the first exemplary embodiment.

FIG. 3 is an enlarged perspective view of the optical scanning apparatus 104 illustrated in FIG. 2. In the optical scanning apparatus 104 according to the first exemplary embodiment, a laser beam passing through the collimator lens 205 is incident on the half mirror 208 (a beam splitter), which is a laser separation unit. The half mirror 208 separates the incident laser beam into a transmitted laser beam (a transmitted light beam) traveling to the polygon mirror 210 and a reflected laser beam (a reflected light beam) traveling to an optical sensor 209, which is a light-receiving unit. The optical sensor 209, receiving the reflected laser beam, outputs a signal with a voltage corresponding to the received light quantity. In addition, the half mirror 208 is a plane-type in which a surface which a laser beam enters and a surface which a transmitted laser beam exits are parallel.

The system control unit 218 illustrated in FIG. 2 compares the voltage of a signal output from the optical sensor 209 and the voltage corresponding to a target light quantity, and controls a current value supplied from the electric circuit board 204 to the semiconductor laser 202 based on a difference of these voltages. More specifically, when the voltage of the signal output from the optical sensor 209 is lower than the voltage corresponding to the target light quantity, the system control unit 218 increases the laser beam quantity by increasing the current supplied from the electric circuit board 204 to the semiconductor laser 202. On the other hand, when the voltage of the signal output from the optical sensor 209 is higher than the voltage corresponding to the target light quantity, the system control unit 218 decreases the laser beam quantity by decreasing the current supplied from the electric circuit board 204 to the semiconductor laser 202. This control is the APC executed by the system control unit 218.

Figure 4:
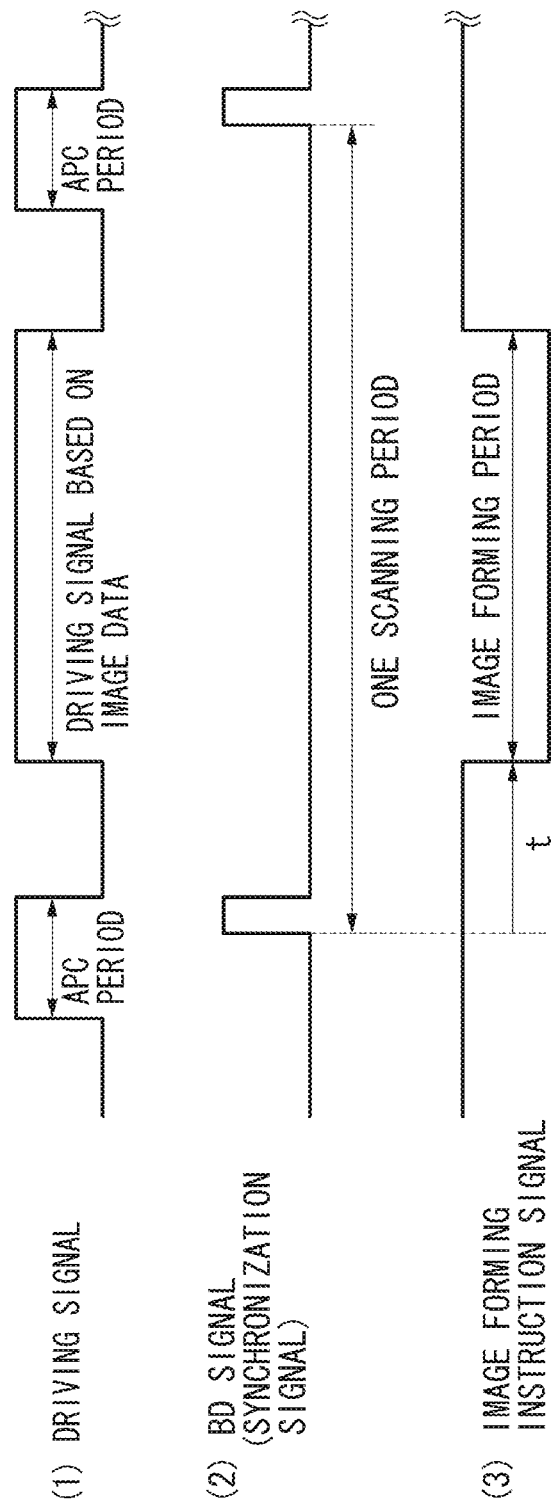
FIG. 4 is a timing chart illustrating timing in which a system control unit executes automatic power control (APC).

FIG. 4 is a timing chart illustrating timing of laser beam emission executed by the system control unit 218 based on the APC and image data, in one scanning period when a laser beam scans the photosensitive drum 102. The system control unit 218 transmits a driving signal to the semiconductor laser 202 to execute the APC and to generate the BD signal (an APC period in FIG. 4) and causes the semiconductor laser 202 to emit a laser beam. In the APC period, the system control unit 218 executes the APC of each light emitting element of the semiconductor laser 202. The system control unit 218 transmits an image forming instruction signal to the semiconductor laser 202 after t seconds of generation of the BD signal, and the semiconductor laser 202 emits a laser beam with the light quantity adjusted in the last APC period based on the image data. The system control unit 218 can make the light quantity stable by performing the APC in every one scanning period.

Figure 5:
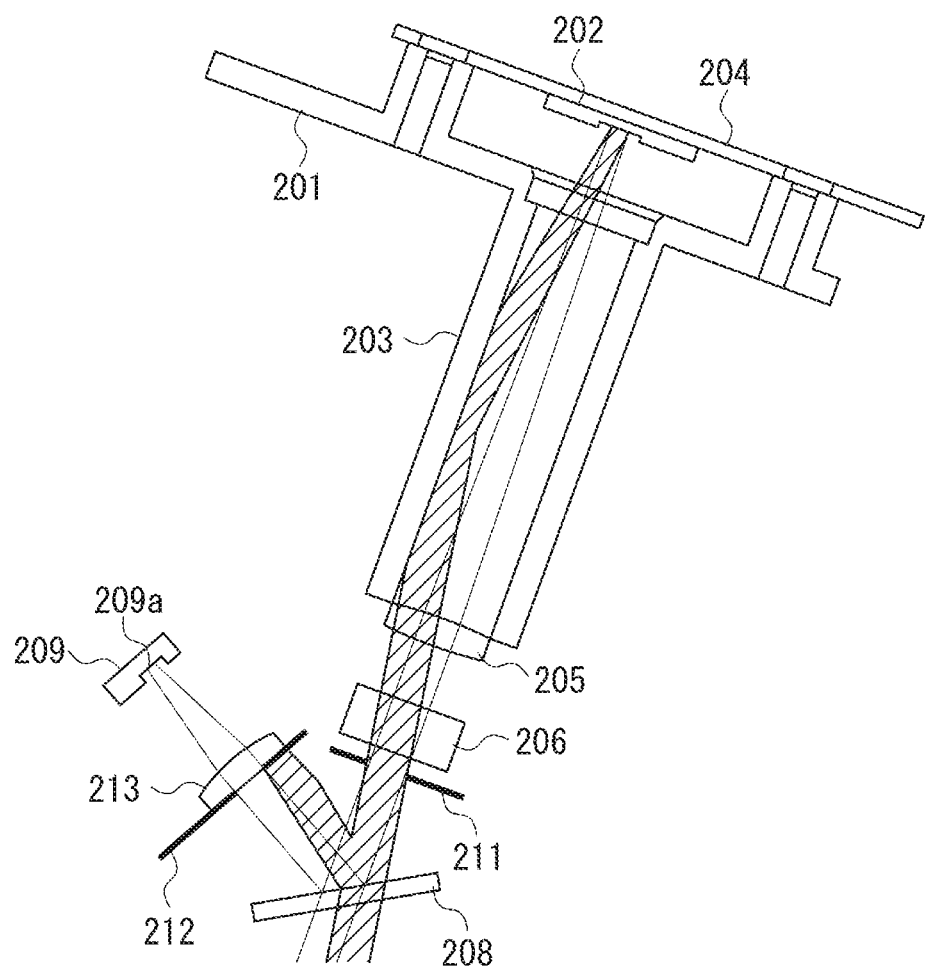
FIG. 5 is an enlarged top plane view illustrating the vicinity of a semiconductor laser provided in the optical scanning apparatus according to the first exemplary embodiment.

Then, the futures of the optical scanning apparatus 104 according to the first exemplary embodiment will be described with reference to FIG. 3 and FIG. 5. FIG. 5 is a top plane view of the optical scanning apparatus 104. As illustrated in FIG. 3, the optical scanning apparatus 104 according to the first exemplary embodiment includes a light blocking member 211 (a first blocking member) located between the collimator lens 205 and the half mirror 208 and configured to restrict passage of a laser beam having passed through the collimator lens 205. The light blocking member 211 is provided to adjust a spot shape of the laser beam. In the light blocking member 211, an opening is provided to transmit a part of the laser beam. Thus, a laser beam that has passed through the opening with the spot shape adjusted is incident on the half mirror 208. The size of the opening of the light blocking member 211 is set to be H1 in the longitudinal direction (the direction of the rotational axis of the polygon mirror 210) and B1 in the lateral direction (the direction perpendicular to the rotational axis of the polygon mirror 210 and the optical axis of the collimator lens 205).

The reflected laser beam, which is a laser beam reflected by the half mirror 208, is restricted from being incident on the optical sensor 209, by a light blocking member 212 located between the half mirror 208 and the optical sensor 209. More specifically, the light blocking member 212 includes an opening. A part of the laser beam reflected by the half mirror 208 passes through the opening to be incident on the optical sensor 209, and another part of the laser beam is blocked. The laser beam passing through the light blocking member 212 is condensed on a light receiving surface 209a of the optical sensor 209 by a condenser lens 213 positioned by the light blocking member 212.

Figure 10:
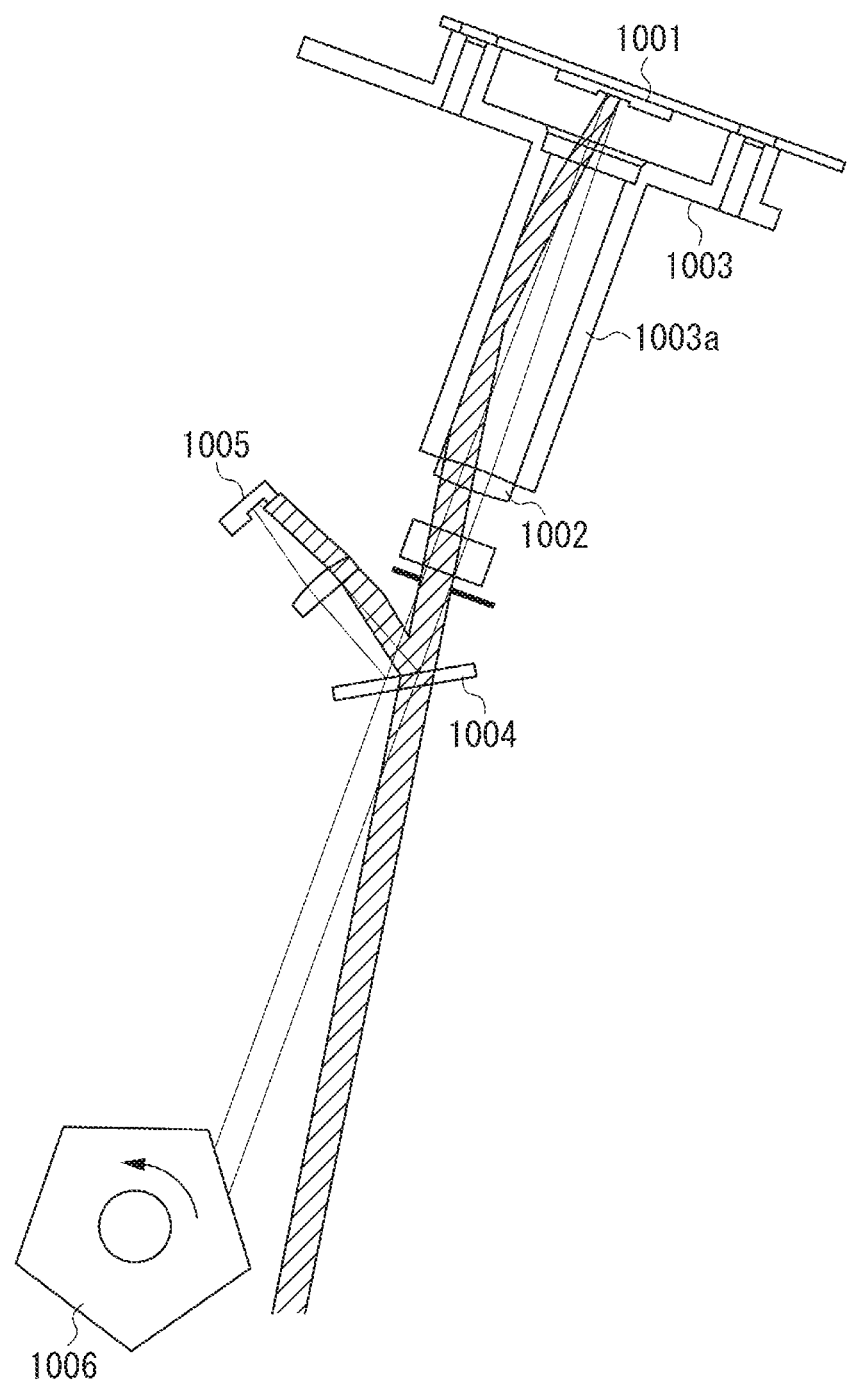
FIG. 10 is an enlarged top plane view illustrating the vicinity of a semiconductor laser provided in a conventional optical scanning apparatus.

As illustrated in FIG. 5 and FIG. 10, since a laser beam emitted from the semiconductor laser 202 is divergent light, a part of the laser beam is reflected by the inner surface of the lens barrel portion 203. A part of the laser beam reflected by the inner surface of the lens barrel portion 203 includes a laser beam that passes through the collimator lens 205 and the light blocking member 211 and that is incident on the half mirror 208. As illustrated in FIG. 10, a further part of that laser beam is reflected by the half mirror 208 and is then guided to the light receiving surface 209a of the optical sensor 209 by the condenser lens 213.

On the other hand, as illustrated in FIG. 10, a laser beam reflected by the inner surface of the lens barrel portion 203, passing through the collimator lens 205 and the light blocking member 211, and then passing through the half mirror 208 is not incident on a reflection surface of the polygon mirror 210. The reason of this is that a light path length from the semiconductor laser 202 to the polygon mirror 210 is relatively longer than a light path length from the semiconductor laser 202 to the optical sensor 209.

The reflected light by the inner surface of the lens barrel portion 203 easily occurs as the lens barrel portion 203 becomes longer. The laser holder 201 defines the position interval between the semiconductor laser 202 and the collimator lens 205, and the lens barrel portion 203 becomes longer as the focal length of the collimator lens 205 becomes longer. To increase the quantity of light passing through the light blocking member 211, it is effective to prolong the focal length of the collimator lens 205. Particularly, in a case where a semiconductor laser 202 with a low light emission quantity is used, this method is used. When the focal length (Fcol) of the collimator lens 205 is short, in light deviating from the optical axis center of the collimator lens 205, light blocked by the light blocking member 211 becomes large. On the other hand, when the focal length (Fcol) of the collimator lens 205 is long, the blocking of light by the light blocking member 211 hardly occurs. Thus, the degree of blocking of the light at the position of the light blocking member 211 decreases even when the light deviates from the optical axis center, so that the light quantity can be effectively used.

Thus, the laser beam reflected by the inner surface of the lens barrel portion 203 and then reflected by the half mirror 208 is guided to the optical sensor 209, but the laser beam passing through the half mirror 208 is not guided onto the photosensitive drum 102. When the FFP varies, the light quantity of the laser beam guided to the optical sensor 209 after being reflected by the inner surface of the lens barrel portion 203 and then reflected by the half mirror 208 changes. Accordingly, the light quantity ratio between the receiving light quantity of the optical sensor 209 and the light quantity on the photosensitive drum 102 varies, so that the correct control of the light quantity becomes difficult.

On the other hand, as illustrated in FIG. 5, the optical scanning apparatus 104 according to the present exemplary embodiment includes the light blocking member 212 (the second light blocking member). The light blocking member 212 blocks a reflected laser beam that is projected towards the optical sensor 209 after being reflected on the inner surface of the lens barrel portion 203, incident on the half mirror 208, and then reflected by the half mirror 208. Thus, the variation of the light quantity ratio can be reduced.

In addition, the width of the opening of the light blocking member 212 is defined to be H2 in the longitudinal direction (the rotational axis direction of the polygon mirror 210), where H2 is longer than H1, and B2 in the lateral direction (the direction perpendicular to the rotational axis of the polygon mirror 210 and the optical axis of the condenser lens 213), where B2 is longer than B1. In other words, to prevent a laser beam that is reflected by the inner surface of the lens barrel portion 203, passes through the light blocking member 211, and is then reflected by the half mirror 208 from being blocked by the light blocking member 212, the opening of the light blocking member 212 is set to be larger than the opening of the light blocking member 211.

The light blocking member 211 and the light blocking member 212 may be often of rectangular shape. As for another shape of the light blocking member, there is an elliptical shape. However, taking the rectangular shape, an opening area becomes relatively large, so that there are disadvantages that the diameter of a laser beam spot can be made small and the depth of focus can be made large. In addition, the light blocking member 211 and the light blocking member 212 may be of elliptical shape, although not illustrated as an exemplary embodiment.

As described above, according to the optical scanning apparatus of the first exemplary embodiment, the variation of the light quantity ratio between the light quantity of a laser beam guided to the photosensitive drum 102 and the light quantity of a light beam incident on the optical sensor 209 according to the variation of the FFP of a laser beam can be reduced, so that correct light quantity control can be performed.

Figure 6:
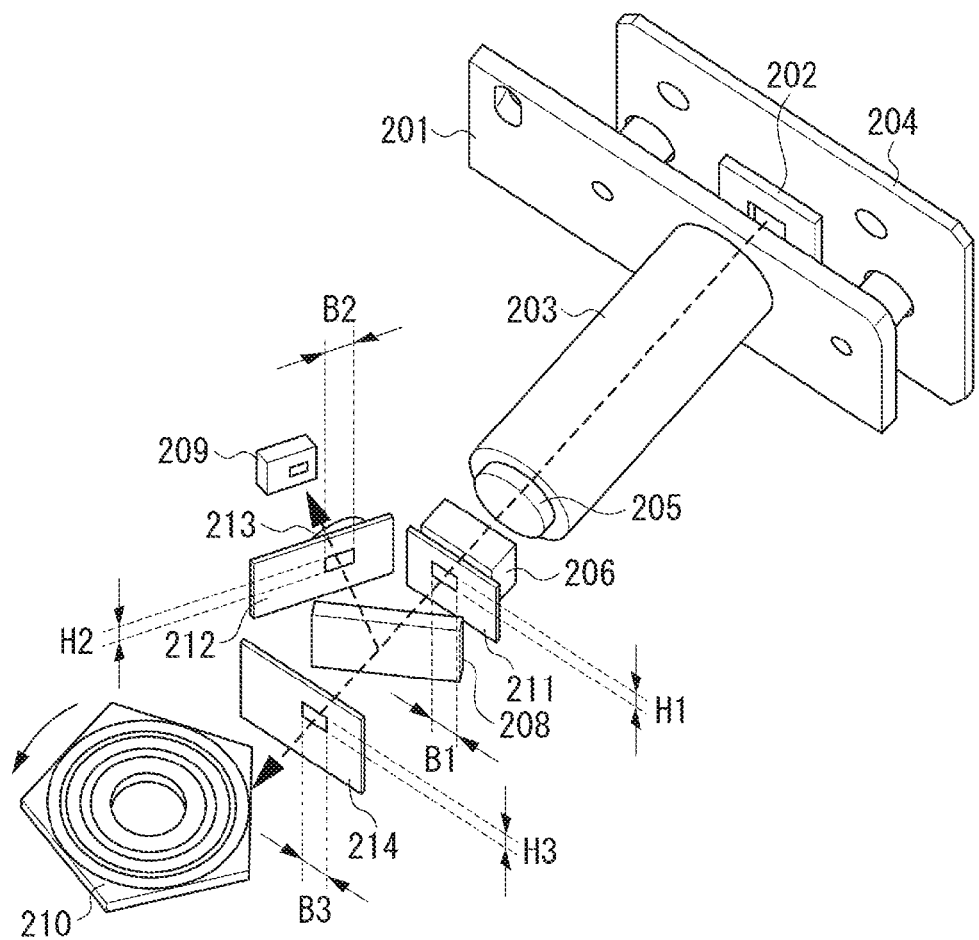
FIG. 6 is an enlarged perspective view illustrating the vicinity of a semiconductor laser provided in an optical scanning apparatus according to a second exemplary embodiment.
Figure 7:
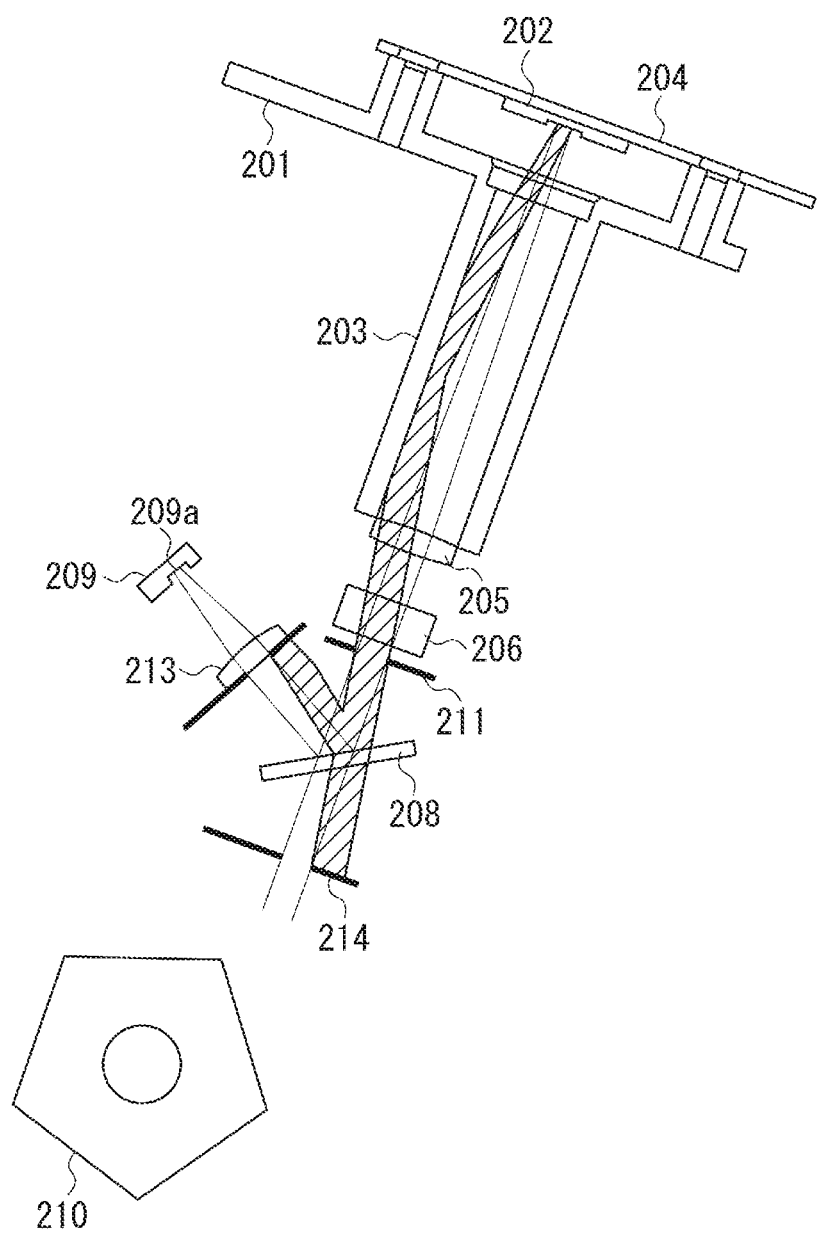
FIG. 7 is an enlarged top plane view illustrating the vicinity of a semiconductor laser provided in the optical scanning apparatus according to the second exemplary embodiment.

A second exemplary embodiment will be described with reference to FIG. 6 and FIG. 7. In the second exemplary embodiment, a third light blocking member 214 is provided between the half mirror 208 and the polygon mirror 210 as illustrated in FIG. 6, and this is the different point from the first exemplary embodiment. Since the other components are similar to those of the first exemplary embodiment, the description thereof will be omitted.

The third light blocking member 214 is particularly effective in an optical scanning apparatus in which the half mirror 208 and the polygon mirror 210 are closer to each other than those in the optical scanning apparatus illustrated in FIG. 2. In a case where the half mirror 208 is close to the polygon mirror 210, a laser beam reflected by the inner surface of the lens barrel 203 passes through the first light blocking member 211, further passes through the half mirror 208, and is then incident on the reflection surface of the polygon mirror 210, as illustrated in FIG. 7. With this process, that laser beam exposes the photosensitive drum 102. To reduce the incidence of that laser beam on the polygon mirror 210, the third light blocking member 214 is provided between the half mirror 208 and the polygon mirror 210. With this structure, forming of a ghost image can be reduced.

The third light blocking member 214 includes a blocking portion for blocking the laser beam reflected by the inner surface of the lens barrel 203. The blocking portion includes an opening for transmitting a laser beam that has passed through the half mirror 208 without being reflected on the inner surface of the lens barrel portion 203.

By using the third light blocking member 214, it can be suppressed to generate a ghost image.

In addition, the light blocking member 211, the light blocking member 212, and the light blocking member 214 may be of elliptical shape, although not illustrated as an exemplary embodiment.

Figure 8:
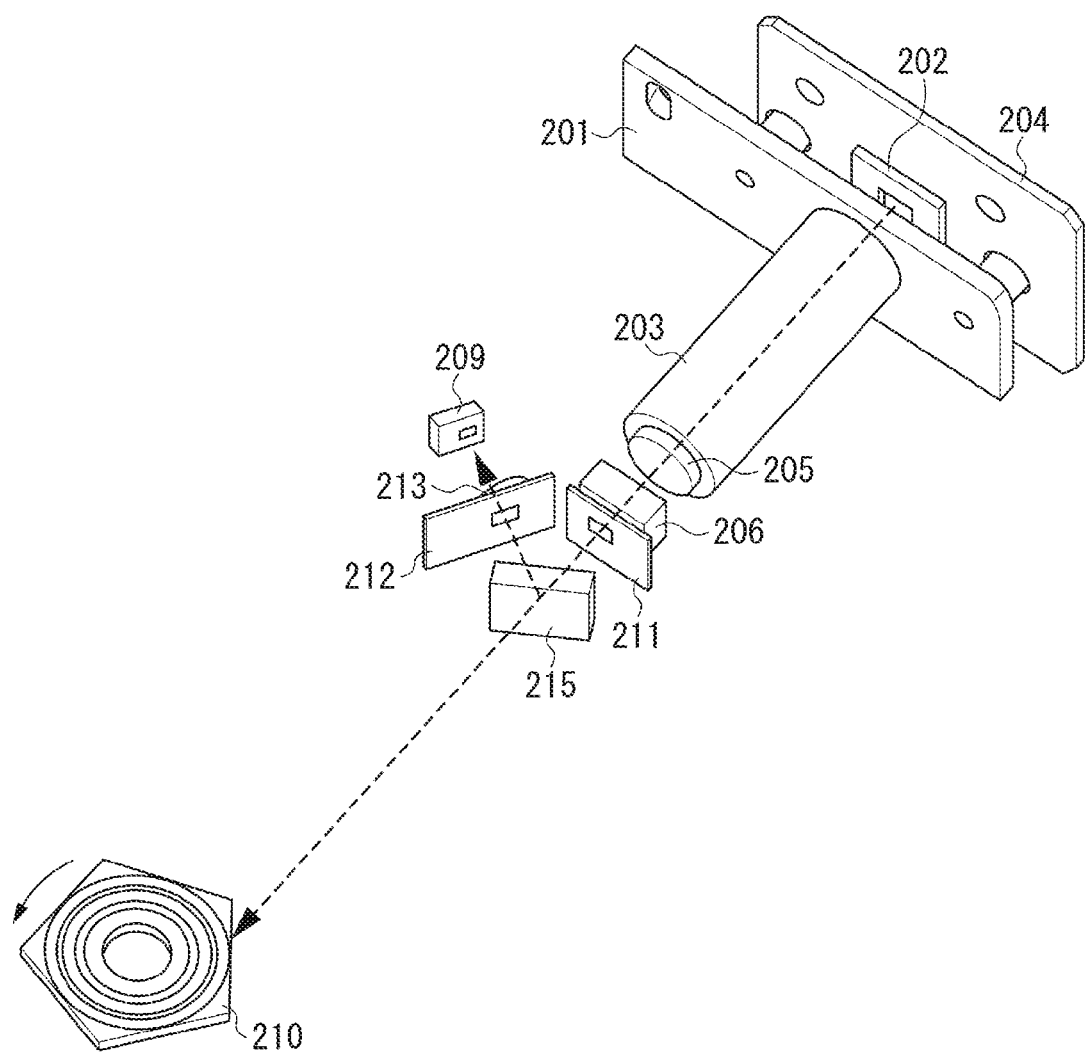
FIG. 8 is an enlarged perspective view illustrating the vicinity of a semiconductor laser provided in an optical scanning apparatus according to a third exemplary embodiment.
Figure 9:
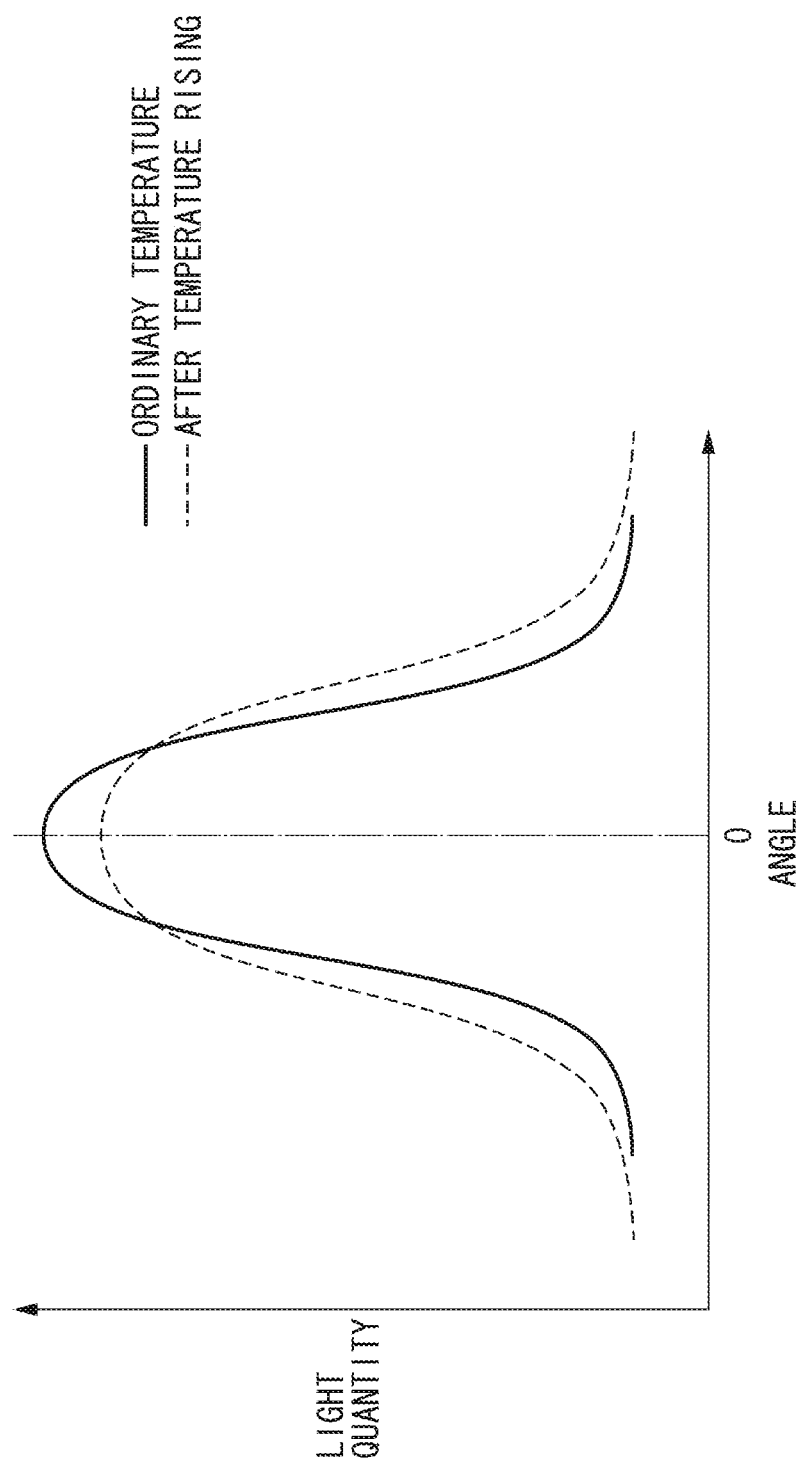
FIG. 9 illustrates a relationship between temperature rising of a semiconductor laser and FFP.

Next, an optical scanning apparatus according to a third exemplary embodiment will be described with reference to FIG. 8. The optical scanning apparatus according to the third exemplary embodiment includes a wedge type half mirror 215, which is a different point from the first exemplary embodiment and the second exemplary embodiment. In the wedge type half mirror 215, a surface which a laser beam enters and a surface which the laser beam exits are not parallel.

In a case where a half mirror 208 in which an entrance surface and an exit surface are parallel is used, the light reflected on the exit surface may interfere with the light reflected on the exit surface to disturb correct light quantity control. On the other hand, as illustrated in FIG. 8, since angles of the light reflected on the exit surface and the light reflected on the entrance surface can be made different by using the wedge type half mirror 215, that interference can be prevented, so that correct light quantity control can be performed.

In addition, the light blocking member 211 and the light blocking member 212 may be of elliptical shape, although not illustrated as an exemplary embodiment.

Aspects of the present disclosure can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-135102 filed Jun. 17, 2011, which is hereby incorporated by reference herein in its entirety.

What is claimed is:

1. A laser beam emission apparatus comprising:
   a laser light source configured to emit a laser beam, the laser light source is a vertical cavity surface emitting laser;
   a collimator lens configured to convert the laser beam emitted from the laser light source into parallel laser beam;
   a holding member configured to support the laser light source and the collimator lens, and including a lens barrel portion through which the laser beam emitted from the laser light source toward the collimator lens passes;
   a separation unit configured to separate the laser beam passing through into a transmitted laser beam and a reflected laser beam;
   an optical unit configured to guide the transmitted laser beam to an irradiated member;
   a light-receiving unit configured to receive the reflected laser beam;
   a condense lens arranged between the separation unit and the light-receiving unit and configured to condense the laser beam, on the light-receiving unit, reflected by the separation unit;
   a control unit configured to control a light quantity of a laser beam emitted from the laser light source based on a light quantity of the reflected laser beam received by the light-receiving unit; and
   a blocking member arranged between the separation unit and the light-receiving unit and configured to block the laser beam so that the laser beam transmitted through the collimator lens by being reflected by an inner surface of the lens barrel portion and being reflected by the separation unit, will not be condensed by the condense lens on the light-receiving unit, and to transmit the laser beam so that the laser beam transmitted through the collimator lens without being reflected by an inner surface of the lens barrel portion and being reflected by the separation unit, will be condensed by the condense lens on the light-receiving unit.

2. The laser beam emission apparatus according to claim 1, further comprising a housing in which at least the separation unit, the light-receiving unit, and the blocking member are located, wherein the separation unit and the blocking member are separately located in the housing.

3. The laser beam emission apparatus according to claim 1, wherein the condense lens contacts the blocking member.

4. The laser beam emission apparatus according to claim 1, wherein the separation unit includes a plate-type beam splitter.

5. The laser beam emission apparatus according to claim 1, wherein the separation unit includes a wedge-type beam splitter.

6. An image forming apparatus comprising:
   the laser beam emission apparatus according to claim 1;
   a photosensitive member serving as the irradiated member; and
   a developing unit configured to develop an electrostatic latent image formed on the photosensitive member by being exposed with the transmitted laser beam.

* * * * *